Nov. 29, 1960 R. G. POPOVICH 2,962,622

TELEVISION DEGAUSSING APPARATUS

Filed Oct. 10, 1958

United States Patent Office 2,962,622

Patented Nov. 29, 1960

2,962,622

TELEVISION DEGAUSSING APPARATUS

Richard G. Popovich, Atlantic Highlands, N.J., assignor to Westinghouse Electric Corporation, East Pittsburgh, Pa., a corporation of Pennsylvania Filed Oct. 10, 1958, Ser. No. 766,503

8 Claims. (Cl. 315—8)

This invention relates to color television receivers, and relates more particularly to means for degaussing the aperture masks, aperture mask frames, and field neutralizing shields of the picture tubes of such receivers.

For compensating for the effect of the earth's magnetic field and of stray magnetic fields upon the operation of the picture tube of color television receivers, it has been the practice to supply magnetic shields or rings of magnets around the face areas of the picture tubes. It has been found that when such receivers were shipped to customers' houses the aperture masks, aperture mask frames, and field neutralizing shields of the picture tubes had become magnetized. It was also found that the aperture mask, aperture mask frames and field neutralizing shields of such a picture tube would become magnetized when the receiver was reoriented or moved around in a customer's home. The magnetized aperture masks, aperture mask frames, and field neutralizing shields have to be degaussed, requiring service adjustments from time to time.

This invention eliminates magnetization of the aperture masks, aperture mask frames, and field neutralizing shields of color television picture tubes, and thereby reduces service calls for color receiver adjustments. In embodiments of this invention, the field neutralizing coils, ordinarily used for purity control, are used as degaussing coils for degaussing the aperture masks and aperture mask frames of picture tubes during picture tube warm-up, switching means being provided for disconnecting the field neutralizing coils from the degaussing circuits, and reconnecting them in the field neutralizing circuits after picture tube warm-up.

An object of this invention is to reduce service calls for adjustment of color television receivers.

Another object of this invention is to degauss the aperture mask of a color television picture tube without requiring a serviceman.

Another object of this invention is to degauss the aperture mask frame of a color television picture tube without requiring a serviceman.

Another object of this invention is to degauss the field neutralizing shield of a color television receiver without requiring a serviceman.

Another object of this invention is to allow the color television receiver to be shipped to a different location, reoriented in a customer's home, or moved around in a customer's home without requiring degaussing by a serviceman.

This invention will now be described with reference to the annexed drawings, of which:

Figure 1:
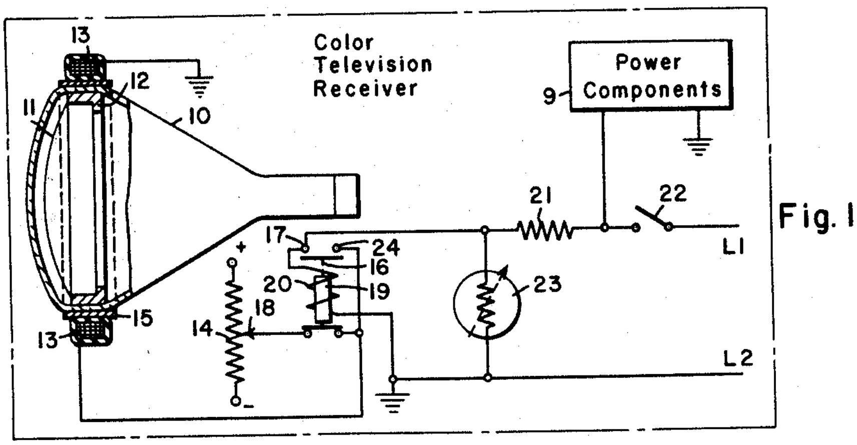
Fig. 1 is a circuit schematic of one embodiment of this invention.
Figure 2:
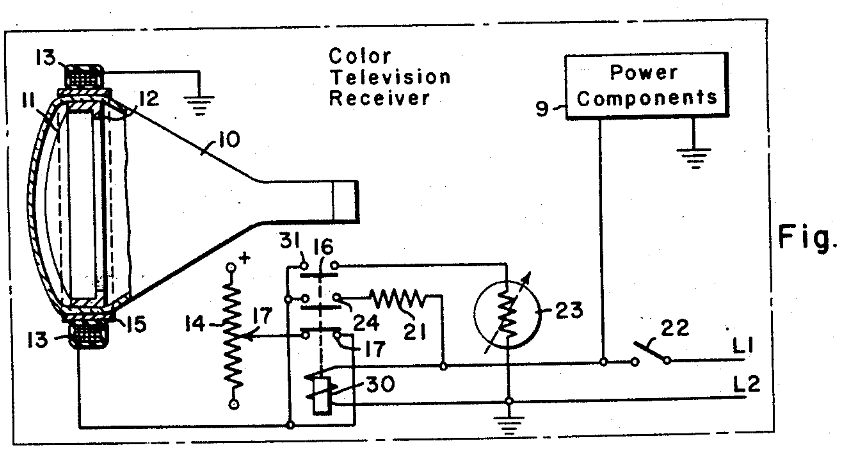
Fig. 2 is a circuit schematic of another embodiment of this invention.
Figure 3:
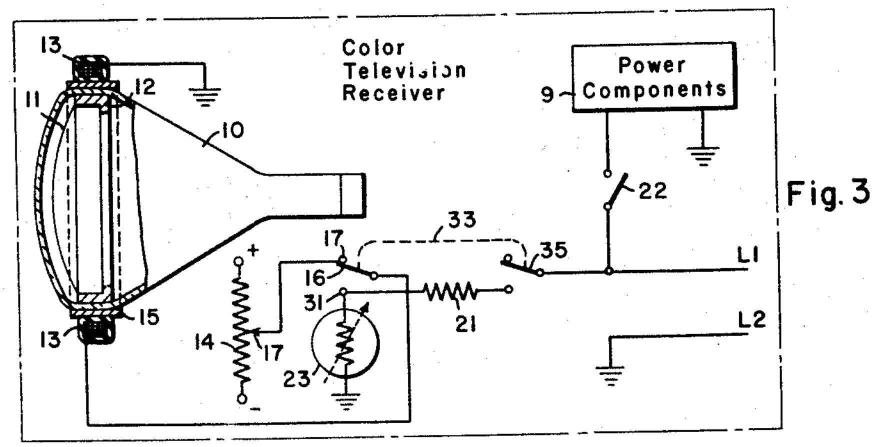
Fig. 3 is a circuit schematic of still another embodiment of this invention.

In Figs. 1, 2 and 3, conventional three-gun, color tubes 10 are shown with conventional aperture masks 11, conventional aperture mask frames 12, conventional field neutralizing coils 13, and conventional field neutralizing potentiometers 14. The frames 12 and the coils 13 are shown in section. A field neutralizing shield 15 may be used with each tube 10.

The potentiometers 14 are field neutralizing purity controls. Their ends are connected as usual, to conventional sources of plus voltages above ground, and negative voltages below ground which are not shown. Such coils and controls are described in detail in "Practical Color Television," Revised Edition, published in 1954 by RCA Service Company, Inc.

Referring now to Fig. 1, one end of the field neutralizing coil 13 is grounded, and its other end is connected to switch 16. The switch 16 is normally spring-biased so that it touches contact 17 which is connected to the slider 18 of the potentiometer 14. This completes the usual field neutralizing circuit.

The switch 16 is mechanically connected to plunger 19 of relay 20. One end of the energizing winding of the relay 20 is connected to ground and to A.C. supply line L2. The other end of the relay winding is connected through resistor 21 and switch 22 (when closed) to the other A.C. supply line L1. A thermistor 23 (a resistor having a negatvie temperature coefficient) is shunted across the relay winding. A contact 24 is connected to that end of the relay winding which is connected to L1 when the switch 22 is closed.

The switch 22 is the usual on-off switch of the television receiver, and connects power components 9 of the receiver to the supply lines L1 and L2. When the switch 22 is closed, the winding of the relay 20 is connected to the supply lines L1 and L2 and is energized. It then pulls down its switch 16 away from the contact 17 of the field neutralizing circuit, and against contact 24 which connects the coil 13 through the resistor 21 and switch 22 to L1, thus supplying A.C. from lines L1 and L2 to the coil 13.

The thermistor 23 is connected across the coil 13 following the closing of the switch 22 but when cold has so high a resistance that it has no appreciable effect upon the current flowing through the coil 13. The flow of current through the thermistor 23 causes it to warm up and its resistance to decrease so that a greater voltage drop occurs across resistor 21, thereby gradually decreasing the current through the coil 13. This reduction of current through the coil 13 causes it to degauss the aperture mask 11, its frame 12, and the field neutralizing shield 15. The resistance of the thermistor 23 continues to decrease, and since the thermistor is shunted across the winding of the relay 20, it finally causes the relay to becomes deenergized and to release its switch 16 which leaves the contact 24 of the degaussing circuit, and touches the contact 17 of the field neutralizing circuit, returning the coil 13 to its normal field neutralizing action.

The time during which degaussing takes place preferably should be adjusted to eleven seconds or less so that the degaussing takes place during warm-up of the receiver when the degaussing action cannot be seen on the picture tube screen.

Fig. 2 is similar in many respects to Fig. 1, but a time-delay relay 30 is used instead of the relay 20, and the thermistor 23 instead of being shunted across the relay winding is connected to an additional contact 31 of the switch 16 so that it is not energized until the switch 16 touches the contact 31 when the relay 30 is energized.

In the operation of Fig. 2, when the on-off switch 22 is closed, the relay 30 is energized and pulls down its switch 16 causing it to leave the contact 17, thereby disconnecting the field neutralizing potentiometer 14, and causing the switch 16 to touch the contacts 24 and 31. The switch 16 and the contact 24 close the degaussing circuit in which lines L1 and L2 are connected to the coil 13. The switch 16 and the contact 31 connect the thermistor 23 across the coil 13, and as the thermistor warms up, the current through the coil decreases so that the aperture mask, its frame and field neutralizing shield are degaussed. The delayed action relay releases its switch 16 at the end of about eleven seconds, deenergizing the thermistor and the degaussing circuit, and again energizing the field neutralizing circuit.

In the circuit of Figs. 1 and 2, relays are used to return the coil 13 to the field neutralizing circuit when sufficient time has elapsed for degaussing to have taken place. In the circuit of Fig. 3, the degaussing is manually controlled. An additional on-off switch 35 is mechanically connected by insulated linkage 33 to the degaussing control switch 16 so that when the switch 35 is closed, the switch 16 will leave the contact 17 of the field neutralizing circuit, and will touch the switch 31 which connects the thermistor 23 across the coil 13. The thermistor is connected through the resistor 21 across L1 and L2 when the switch 35 is closed. Degaussing starts as the thermistor warms up, and is seen on the picture tube screen as a multicolor picture which changes to black-and-white when the degaussing is completed. When the operator sees the picture turn to black-and-white, the switch 35 is opened and causes the switch 16 to leave the contact 31 of the thermistor 23, disconnecting the thermistor from L1, and causes the switch 16 to again touch contact 16, reconnecting the coil 13 in the field neutralizing circuit.

Since numerous changes may be made in the above-described construction, and different embodiments of the invention may be made without departing from the spirit and scope thereof, it is intended that all matter contained in the foregoing description or shown in the accompanying drawings shall be interpreted as illustrative, and not in a limiting sense.

I claim as my invention:

1. A degaussing circuit for a color television picture tube having an aperture mask and a frame for said mask, comprising a coil adjacent to said frame, a resistor having a negative temperature coefficient, alternating current supply connections, and means for connecting said resistor and said coil to said connections.

2. A degaussing circuit for a color television picture tube having an aperture mask, a frame for said mask, a field neutralizing coil around said frame, and a field neutralizing control, comprising a resistor having a negative temperature coefficient, alternating current supply connections, and switching means for connecting said coil to said control and for disconnecting said coil from said control and connecting said coil and said resistor to said connections.

3. A degaussing circuit for a picture tube of a color television receiver, said tube having an aperture mask, a frame for said mask, a field neutralizing coil around said mask, and a field neutralizing control, said receiver having power components, alternating current supply connections, and an on-off switch for connecting said connections to and for disconnecting said connections from said components, said circuit comprising a relay having an energizing winding connected to said switch so as to be energized when said switch is turned on, a resistor having a negative temperature coefficient connected across said relay winding so as to be energized when said winding is energized, said relay having switching means which connects said coil to said control when said relay winding is deenergized, and which connect said coil across said resistor when said relay winding is energized.

4. A degaussing circuit for a picture tube of a color television receiver, said tube having an aperture mask, a frame for said mask, a field neutralizing coil around said mask, and a field neutralizing control; said receiver having power components, alternating current connections, and an on-off switch for connecting said connections to and for disconnecting said connections from said power components; said circuit comprising a time-delay relay having an energizing coil connected to said switch and energized when said switch is turned on, and a resistor having a negative temperature coefficient, said relay having switching means which connects said coil to said control when said relay winding is deenergized and which connects said coil and resistor to the said connections when said relay winding is energized.

5. A degaussing circuit for a color television picture tube having an aperture mask, a frame for said mask, a field neutralizing coil around said mask, and a field neutralizing control; said circuit comprising a resistor having a negative temperature characteristic, a pair of alternating current supply connections and switching means having first and second positions for respectively connecting said coil and said resistor across said connections when in said first position and for disconnecting said coil and said resistor from across said connections and connecting said coil to said control when in said second position.

6. A degaussing circuit for a color television receiver having a picture tube, said tube having an aperture mask, a frame for said mask, a field neutralizing coil around said mask, and a field neutralizing coil, said receiver having power components, alternating current connections, and an on-off switch for connecting said components to said connections, said circuit comprising a resistor having a negative temperature characteristic, means normally connecting said coil to said control, and means energized when said switch is closed for disconnecting said coil from said control and connecting said coil and resistor to said connections.

7. In a color television receiver including a color image reproducing cathode ray tube having an aperture mask of magnetizable material and a neutralizing coil peripherally encompassing said tube near the viewing end thereof for providing an induced magnetic field in the vicinity of said mask to affect the path of the electron beam of said tube, the combination of: an alternating current source; field neutralizing control means for providing an adjustable direct current voltage; a resistor having a negative temperature coefficient; and switching means having first and second positions, said switching means being adapted when in said first position to connect said coil to said field neutralizing control means so that said coil produces a substantially unvarying magnetic field for cancelling a predetermined component of the earth's magnetic field within said tube and being adapted when in said second position to connect said coil and said resistor in shunt relation to said alternating current source so that the alternating current passing through said coil is gradually decreased to thereby demagnetize said aperture mask.

8. In color television apparatus including an alternating current source, a color image reproducing cathode ray tube having an aperture mask of magnetizable metal, a field neutralizing coil peripherally encompassing said tube near the image end thereof and normally connected to and operative with an adjustable voltage direct current source to provide a static magnetic flux for neutralizing a predetermined component of the earth's magnetic field within said tube; the combination therewith of a resistor having a negative temperature coefficient and switching means for disconnecting said coil from said direct current source and for connecting said coil in parallel with said resistor to said alternating current source so that said resistor is heated by alternating current energy and exhibits decreasing resistance whereby alternating current is gradually diverted from said coil and said aperture mask is demagnetized by the gradually decreasing alternating flux field of said coil.

References Cited in the file of this patent

UNITED STATES PATENTS

| | | |
|---|---|---|
| 2,387,608 | Paumier | Oct. 23, 1945 |
| 2,421,583 | Stuart | June 3, 1947 |
| 2,769,121 | Rogoff | Oct. 30, 1956 |
| 2,832,041 | Trachtenberg | Apr. 22, 1958 |
| 2,898,509 | Clay et al. | Aug. 4, 1959 |